Patented Nov. 21, 1950

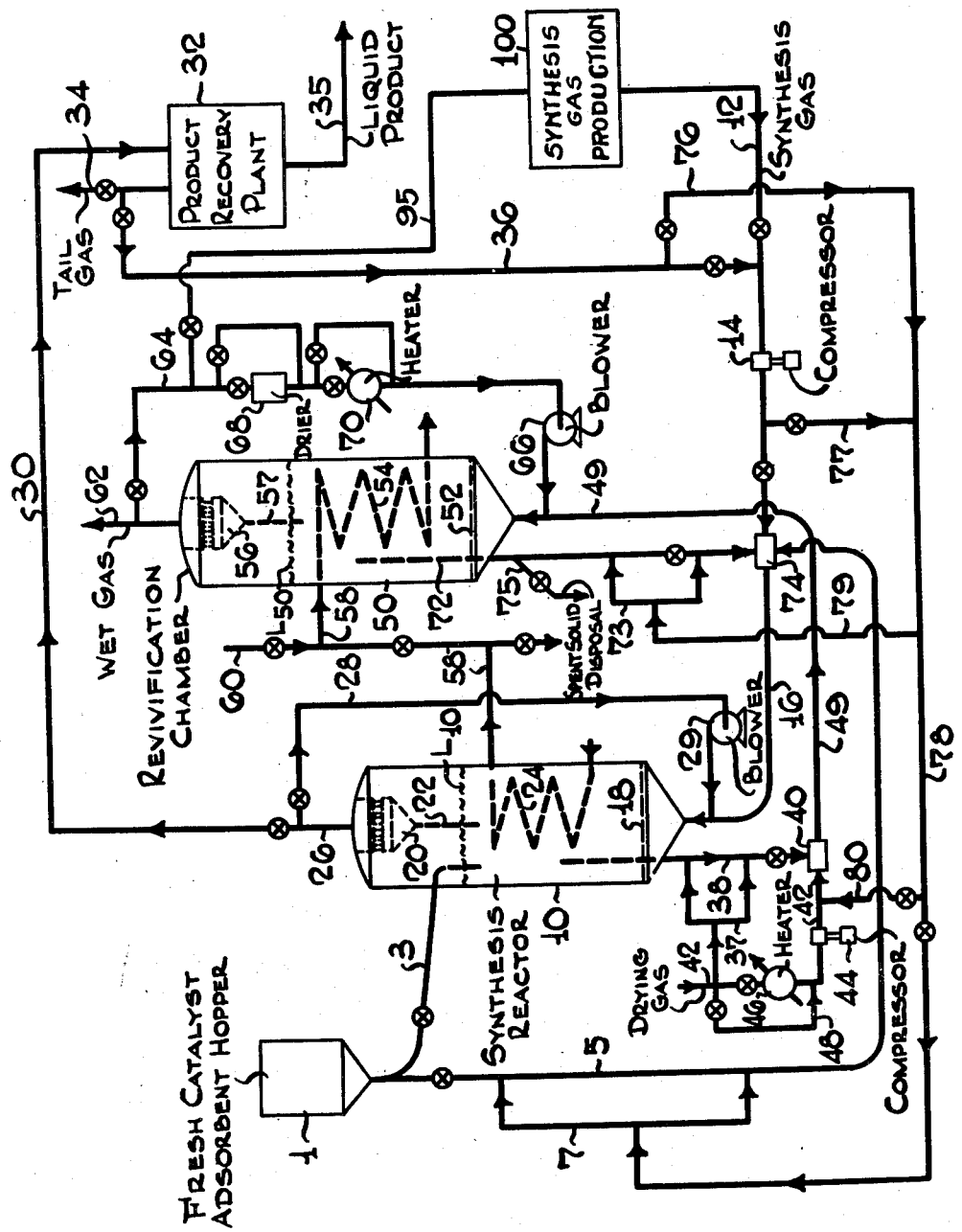

2,530,977

UNITED STATES PATENT OFFICE 2,530,977

FLUIDIZED HYDROCARBON SYNTHESIS PROCESS

Homer Z. Martin, Roselle, N. J., assignor to Standard Oil Development Company, a corporation of Delaware Application December 29, 1945, Serial No. 638,421

17 Claims. (Cl. 260—449.6)

The present invention relates to the catalytic conversion of mixtures of carbon oxides with hydrogen to form valuable synthetic products such as hydrocarbons having more than one carbon atom per molecule and oxygenated organic compounds. More particularly, the invention is concerned with an improved method for controlling the ratio of consumption of the reactants in the catalytic conversion of CO and $H_2$.

It is known in the art to react hydrogen with oxides of carbon, particularly CO, in the presence of suitable catalysts to produce synthetic hydrocarbon oils, preferably of the motor fuel boiling range, as well as various oxygenated compounds. Iron and cobalt are the catalysts most widely used even though satisfactory results have been obtained, for example, in the presence of nickel, cerium, chromium, manganese, osmium, palladium, titanium, zinc and oxides or other compounds of these metals as well as mixtures of the same. Operating conditions vary widely, depending on the feed materials employed, the catalyst used and the products desired. In general, CO and $H_2$, preferably in the ratio of one volume of CO to two volumes of $H_2$, are reacted at pressures varying from atmospheric to about 45 atm., temperatures from about 350° to about 800° F. and space velocities of 75–1500 volumes of reacting gases per volume of catalyst space per hour. The catalysts are employed in lump or powdered form, the particle size depending on the general character of the operation which may be of the fixed, moving or fluid bed type.

The synthesis reaction is highly exothermic as well as temperature-sensitive and the character and quantity of the products formed may vary widely as a function of the ratio in which CO and $H_2$ enter into the reaction. Proper control of temperature and conversion ratio are therefore the most critical single factors for a successful operation of the hydrocarbon synthesis. The problem of temperature control has been satisfactorily solved by the application of the fluid solids technique employing a finely-divided catalyst in the form of a dense, highly turbulent, fluidized bed of solids having ideal heat-transfer characteristics. The advantages of this technique have been further enhanced by the recycle of suitable proportions of unconverted tail gases of the desired temperature.

However, the maintenance of a desired conversion ratio of the reactants is still encountering considerable difficulties, mainly due to the fact that the reactants CO and $H_2$ at all practical reaction conditions are consumed in a ratio different from that at which they are supplied to the reaction zone. The result is that there is at all times an excess of one of the reactants present in the reaction zone, which affects the desired equilibrium and, in addition, complicates considerably any recycle of tail gas which must be readjusted to the proper feed ratio by the addition of make-up proportions of the component in which the tail gas is deficient.

The present invention overcomes the aforementioned difficulties and affords various additional advantages. These advantages, the nature of the invention and the manner in which it is performed will be fully understood from the following description thereof read with reference to the accompanying drawing which shows a semi-diagrammatic view of apparatus adapted to carry out a preferred embodiment of the invention.

It is the main object of the present invention to provide an improved process for producing valuable synthetic products by a catalytic conversion of carbon oxides with hydrogen.

Another object of the present invention is to provide an improved method for controlling the ratio of consumption of the reactants of the catalytic synthesis of hydrocarbons and oxygenated compounds from CO and $H_2$.

A further object of the present invention is an improved method for maintaining the ratio of consumption of the reactants in the hydrocarbon synthesis from CO and $H_2$ at a value approaching that of the ratio at which the reactants are fed to the reaction zone.

A more specific object of the present invention is an improved method of controlling the ratio of consumption of the reactants of the hydrocarbon synthesis from CO and $H_2$ employing the fluid solids technique.

Other and further objects and advantages of the invention will appear hereinafter.

It has been found that these objects and advantages may be accomplished quite generally by carrying out the synthesis reaction in the presence of a water-adsorbent material which is added to the conventional catalyst so as to remove the water vapor from the gas phase of the reaction zone. Extensive research work has demonstrated that the $H_2$:CO consumption ratio is consistently lower than the $H_2$:CO ratio in the feed gas, particularly when the latter approaches or exceeds the value of 2. This discrepancy may be substantially reduced or almost completely removed by the addition to the catalyst of my water-adsorbent materials.

While the invention is not to be limited by any theory of the reaction mechanism involved which is not yet fully understood, the beneficial effects of the new method may be explained on the basis of accepted theories and experimental results, as follows:

The reaction of $H_2$ with CO to form hydrocarbons may be considered to take place according to the following two reactions

$$2H_2 + CO \rightarrow CH_2 + H_2O \quad \ldots \quad (1)$$
$$H_2 + 2CO \rightarrow CH_2 + CO_2 \quad \ldots \quad (2)$$

In conventional operation, the reaction products of both reactions are all removed simultaneously and continuously from the reaction zone, thus permitting both reactions to proceed, with the result that the $H_2$:CO consumption ratio is depressed considerably below the value of 2, and below the feed ratio of any synthesis gas containing about 0.7 or more volumes of $H_2$ per volume of CO. Theoretically, the consumption ratio may drop to as low as 0.5 in accordance with Equation 2. However, as a result of some hydrogenation of the $CH_2$ taking place, the consumption ratio will be higher than 0.5 even if the reaction proceeds substantially as indicated by Equation 2. The addition of water-adsorbent materials effects a selective removal of water vapor from the vapor phase of the reaction zone whereby, in accordance with the law of mass action, Reaction 1 is favored since the concentration of one of its reaction products in the gas phase is reduced. Reaction 1 has the higher $H_2$:CO consumption ratio and thus the overall $H_2$:CO consumption ratio of the reaction can be increased to a value approaching or even exceeding 2. It has also been found that in this manner the $H_2$:CO consumption ratio may be readily controlled to equal very nearly the $H_2$:CO ratio in any fresh feed gas containing more than about 0.7 volumes of $H_2$ per volume of CO. Thus, the presence of excess reactants in the reaction zone is avoided and the per cent conversion and hydrocarbon yield based on feed gas having a $H_2$:CO ratio of >0.7:1 are improved. Operation with this type of synthesis gas has the great advantage that the feed gas may be more readily obtained than a gas containing lower $H_2$:CO ratios, particularly when starting with natural gas as a raw material, because less $CO_2$ recycle is required as the $H_2$:CO ratio in the gas produced increases. Moreover, the quantity of $CO_2$ in the synthesis tail gas decreases as the $H_2$:CO consumption ratio increases, for any given distribution of desired conversion products. This facilitates the recovery of the light hydrocarbon products.

Quite generally, solid adsorbents which have a strong and preferably selective adsorbing power for water vapor at the reaction conditions and which do not detrimentally affect the catalytic reaction conditions are most suitable for the purposes of the present invention. Examples of useful adsorbents are such non-basic materials as silica gel, alumina, Activated Alumina, Superfiltrol, calcium chloride, and the like. The efficiency of the process increases with the adsorbing power of the adsorbents and also with their selectivity, that is, the ratio at which they adsorb water vapor in preference to other reaction products and reactants, particularly $CO_2$, present in the reaction zone. These materials may be mixed with the catalyst in amounts varying between about 10% and 100%, preferably 20-50% by weight of the catalyst, and applied together with the catalyst in fixed, moving, or fluid bed operation. While the present invention may be applied in connection with any conventional synthesis catalysts of the types specified above, best results are obtained in connection with iron catalysts which are usually applied at relatively high temperatures of about 450°–800° F. and pressures of about 10–45 atm.

In order to maintain the adsorbing power of the added materials at the most effective level, it is advisable to remove periodically or continuously the water adsorbed on the solids. This may be accomplished by blowing the relatively saturated adsorbent material with a dry, preferably non-oxidizing gas such as natural gas, hydrogen, flue gas, $CO_2$, or weakly reactive synthesis gas mixtures at temperatures between about 150° and about 700° F., preferably 500–700° F., depending on the amount of water to be removed and the pressure applied. In fixed bed operation the reaction may be interrupted between intervals of about 1–50 hours in order to admit a drying gas of the type specified for relatively short periods of about 5–100 minutes at the temperatures mentioned above, specific conditions depending on the amount of water adsorbed and the degree of revivification desired. External heat may be supplied in any conventional manner. For example, the drying gas may be preheated or an auxiliary Dow-therm vapor heating system may be connected to the conventional synthesis cooling system so as to condense Dow-therm vapors in the cooling coils during the revivification period. Other means of heat supply include a limited exothermic synthesis reaction maintained during the revivification period by feeding synthesis gas to the catalyst-adsorbent mixture in amounts or proportions adapted to generate the amount of heat required.

The present invention may be applied to greatest advantage in connection with operations involving or permitting a continuous feed and withdrawal of catalyst to and from the reaction zone, such as moving or fluid bed operation. Particularly when the fluid solids technique is employed, the catalyst-adsorbent mixture may be readily removed from the reaction zone, passed through a separate revivification zone and returned to the reaction zone by means well known in the art of handling fluidized solids. The means for drying the catalyst-adsorbent mixture in said separate revivification zone may be the same as those outlined above in connection with fixed bed operation, the drying gas being used for the fluidization of the solids in the revivification zone.

Having set forth the objects and general nature, the invention will be best understood from the more detailed description hereinafter, in which reference will be made to the accompanying drawing which shows a partly schematic and partly diagrammatic view of apparatus suitable for carrying out a preferred embodiment of my invention.

Referring now in detail to the drawing, the system illustrated therein is specifically adapted to the use of my invention in connection with a hydrocarbon synthesis employing the fluid solids technique and iron as the synthesis catalyst. The apparatus essentially comprises a synthesis reactor 10 and a revivification chamber 50 of similar design cooperating, as will be presently explained.

A mixture of finely-divided synthesis catalyst and solid water-adsorbent material is fed from feed hopper 1 through line 3 to synthesis reactor 10. The mixture preferably consists of about 50-80% of iron catalyst and about 20-50% of alumina, both solids being of a fluidizable particle size mainly falling within the range of from 100-400 mesh, and being sized so as to form a uniform mixture of catalyst and adsorbent at the flow conditions in the reactor. Fresh synthesis gas, comprising $H_2$ and CO in the desired proportion, for example of about two volumes of $H_2$ to one volume of CO, is supplied through lines 12 and 16 by means of compressor 14 to the bottom section of reactor 10 below a perforated distribution plate or grid 18. The gas velocity within reactor 10 is controlled within the limits of from ¼ to 10 ft., preferably ½-3 ft. per second so as to maintain the mixture of catalyst and adsorbent in reactor 10 in the form of a dense, highly turbulent, fluidized mass of solids having a well-defined upper level $L_{10}$ which is determined by the amount of solids present and the superficial velocity of the fluidizing gas in reactor 10. Due to the phenomenon of hindered settling of solid particles, only a small proportion of the solids is carried into the zone above level $L_{10}$ which serves as a solids disengaging zone. For instance, the fluidized solids mass below level $L_{10}$ may have a density of 15-150 lbs. per cu. ft., while the solids density above level $L_{10}$ may be as low as 0.01 lbs. per cu. ft., or less. The solid particles reaching the disengaging zone are separated from the reacted gas in a conventional gas-solids separator 20 and returned to the dense solids mass through pipe 22. When the dense solids phase reaches the desired level $L_{10}$ the supply of fresh solids through line 3 may be stopped. A cooling system 24 of any suitable design is provided to maintain the reaction temperature at the desired optimum level which lies preferably between about 450° and 700° F. The pressure within reactor 10 is preferably maintained between about 7 and 25 atm. The cooling system 24 may be used during the starting period to preheat the dense solids phase to the desired starting temperature.

Volatile synthesis products and unreacted synthesis gas are withdrawn overhead from separator 20 through line 26. If desired a portion of the mixture of vapors and gases in line 26 may be recycled at about reaction temperature through line 28 by means of blower 29 to gas feed line 16 and reactor 10 to assist in the control of reaction temperature and/or fluidization in reactor 10. That portion of the volatile reaction products which is not recycled to reactor 10 is passed through line 30 to a product recovery plant schematically shown at 32 from which liquid product may be withdrawn through line 35. Tail gas, which may contain $CO_2$, may either be vented through line 34 or recycled through lines 36, 12 and 16 to reactor 10 for assisting in reducing $CO_2$ formation and raising the $H_2$:CO consumption ratio, or it may be returned to the synthesis gas manufacturing plant. It is of particular advantage to dry the tail gas prior to its recycle to the synthesis reactor. Recycle of dry or substantially dry tail gas greatly assists the solid water-adsorbent in the removal of water from the reaction zone.

Returing now to reactor 10, fluidized solids comprising catalyst and water-adsorbent material are withdrawn either continuously or at intervals from the dense phase downwardly through a standpipe 38 and passed to a dispersing chamber 40. The flow of the solids through pipe 38 is facilitated by the addition of small amounts of a fluidizing gas through manifold 37. The solids in dispersing chamber 40 are taken up by a dry, preferably non-oxidizing gas, such as natural gas, hydrogen, flue gas or the like, supplied through line 42 by means of compressor 44. The dry gas may be preheated in heater 46 to any desired temperature, say between 100° and 500° F., or passed around heater 46 through line 48. The suspension formed in dispersing chamber 40 is of considerably lower density than that of the fluidized column in standpipe 38 and is passed under the pseudo-hydrostatic pressure of said column through line 49 to the bottom section of revivification chamber 50, preferably below the distribution plate or grid 52.

Revivification chamber 50, which is of a design similar to that of reactor 10, is provided with a heating system 54 and a gas-solids separator 56 having a solids return pipe 57. The gas velocity in chamber 50 is so controlled as to establish a dense, turbulent, fluidized mass of solids having a well-defined upper level $L_{50}$ within chamber 50 in a manner similar to that outlined in connection with reactor 10. Sufficient heat is supplied by heating means 54 to cause, in cooperation with the dry gas, rapid evaporation of the water adsorbed on the solids. As a result of the drying effect of the gas, the temperature of the dense phase in chamber 50 may, if desired, be kept somewhat lower than the reaction temperature in reactor 10, say between the approximate limits of 450° and 650° F., at about the same or lower pressures as those maintained in reactor 10. In this case, used cooling fluid from cooling system 24 in reactor 10 may be fed approximately at reaction temperature through line 58 to the heating system 54 to supply the heat required therein. Additional heating fluid may be supplied to heating system 54 through line 60, if higher temperatures are desired in chamber 50. Wet gas substantially free of entrained solids may be vented through line 62 and/or recycled through line 64 to chamber 50 by means of blower 66. The recycled portion of the wet gas is preferably dried in a conventional gas drier 68 and reheated in heater 70 prior to its return to chamber 50. Product recovery means may be combined with drier 68 to recover any synthesis products carried over by the solids from reactor 10 to chamber 50.

A fluidized substantially dry mixture of catalyst and adsorbent is withdrawn from the dense phase of chamber 50 downwardly through a standpipe 72 and passed to dispersing chamber 74 where it is suspended in fresh synthesis gas supplied through line 12 by compressor 14. Standpipe 72 is further aerated, preferably by means of small amounts of synthesis feed or tail gas supplied through manifold 73 via lines 76 or 77 and lines 78 and 79. The suspension formed in dispersing chamber 74 has a density substantially lower than that of the fluidized column in standpipe 72 and is passed under the pseudo-hydrostatic pressure of said column through line 16 to reactor 10.

The rate of solids circulation between vessels 10 and 50 is preferably so controlled that levels $L_{10}$ and $L_{50}$ are maintained substantially constant. Catalyst activity may be maintained at the desired strength by continuously or periodically feeding small amounts of fresh or regenerated catalyst to reactor 10 through line 3 and withdrawing a corresponding amount of spent solid from chamber 50 through line 75. The spent solids thus withdrawn may, if desired, be separated by elutriation or flotation into catalyst and adsorbent, the former regenerated by oxidation and reduction and the latter revivified by drying and/or activation, both in a manner known per se. In many cases the conditions of catalyst regeneration will be suitable for adsorbent revivification and a separation of catalyst and adsorbent will not be necessary. The regenerated and revivified materials may be returned to feed hopper 1 for reuse in the system.

The embodiment of the present invention illustrated by the drawing permits of various modifications. While the operation of the system shown has been explained with reference to a high-temperature high-pressure conversion in the presence of iron catalysts, it should be understood that other synthesis catalysts, for example cobalt, may be used at the lower temperatures of about 350°–450° F. and lower pressures of about atmospheric to 10 atm., commonly employed in connection with such other catalysts. Other, preferably non-basic, water-adsorbents such as Superfiltrol, silica gel, calcium chloride, etc., which adsorb water in preference to $CO_2$, may be used in place of alumina. Furthermore, fresh or make-up catalyst-adsorbent mixture may be supplied from hopper 1 to reactor 10 under the pressure of standpipe 5 via the dispersing chamber 74, aerating gas, such as synthesis feed or tail gas being fed to standpipe 5 through manifold 7 via line 78 from line 76 or 77. Small amounts of synthesis gas from line 78 may also be supplied through lines 80, 42 and 49 to chamber 50 to assist in the drying procedure by a limited exothermic reaction. Other means than standpipes, for example pneumatic means, mechanical feeders or conveyors or the like, may be used to circulate the solids through the system.

Two dense phase zones may be arranged in vessel 50, the drying gas being passed through said zones in series and the fluidized solids from zone to zone in a direction opposite to the gas flow. In this manner, fluidized solids of a higher average degree of dryness may be returned to the reactor 10 from the dense phase zone first contacted by the drying gas. A similar arrangement may be provided in reactor 10 to provide countercurrent flow between the gaseous reactants and the solids. If desired, the solids withdrawn from reactor 10 may be passed through a stripping zone to remove any adhering synthesis products by means of a stripping gas such as the gas used in revivification chamber 50, prior to the entry of the solids into chamber 50. Similarly, the solids withdrawn from chamber 50 may be stripped of any adhering water vapor or drying gas with the aid of a stripping gas such as fresh synthesis gas or synthesis tail gas, prior to the return of the solids to reactor 10.

In regard to the revivification of the drying agent in vessel 50, the following methods may be applied. External heating in the revivification chamber 50 by means, for example, of a Dow-therm heating circuit to drive off the water is one method. While this requires extraneous fuel, a corresponding additional amount of useful steam will be generated in the cooling coils of the synthesis reactor as a result of heat of adsorption liberated, this amount of steam being in excess of that which would be generated if no adsorbent were used, so that the added fuel can not be considered a disadvantage. This method has the advantage that the revivification may be carried out at somewhat higher temperature than that in the reactor 10 so that reactor 10 and revivification chamber 50 can be at about the same pressures. The quantity of solids circulated to revivification chamber 50 will be lower than by any other method and the quantity of gas to be circulated through the solids in chamber 50 to carry off the released water vapor will also be low. Another method is to arrange the revivification chamber 50 in an elevated location so that the pressure in this chamber can be considerably less than in the synthesis reactor 10. This facilitates the removal of the water vapor and the heat can be supplied substantially by circulating solid material from the synthesis reactor 10 to the revivification chamber 50. Fairly high rates of solids circulation are needed in order to reduce the temperature drop between the two chambers to a minimum. The advantage of this method is that no extraneous fuel is needed in the plant and no extra steam is made, which may be a requirement in some installations. The last mentioned method can be combined with the transfer of heat-transfer medium from the synthesis reactor 10 to the revivification chamber 50, the cooled heat-transfer medium being returned in the opposite direction. This arrangement tends to reduce the quantity of solids which must be circulated between the two vessels. Finally, part or all of the natural gas to be used in synthesis gas manufacture may be passed via lines 42 and 49 through the revivification vessel where it will carry off the water released by the water adsorbent. This gas may be substantially freed of solids by cyclone separators 56 and sent via line 95 to the synthesis gas preparation plant 100, where the water vapor it now contains is one of the reagents.

Other modifications within the scope of the invention will occur to those skilled in the art.

The invention will be further illustrated by the following specific example.

*Example*

When a synthesis gas containing $H_2$ and CO in the ratio of 2:1 is contacted with a powdered iron catalyst at a temperature of about 600° F., and a pressure of about 100–150 lbs./sq. in. gauge, the following products are obtained per mol of CO fed:

|  | Mols |
|---|---|
| $CH_2$* | 0.728 |
| $H_2O$ | 0.466 |
| $CO_2$ | 0.262 |
| $H_2$ | 0.806 |
| CO | 0.01 |
| Consumption Ratio | 1.21 |

* Total hydrocarbons.

When about an equal weight of alumina is added to the catalyst to bring the water vapor in the gas phase down to a figure of 0.01 mols per mol of CO fed to the unit, the following yields are obtained:

|  | Mols |
|---|---|
| $CH_2$ | 0.955 |
| $H_2O$* | 0.919 |
| $CO_2$ | 0.036 |
| $H_2$ | 0.126 |
| CO | 0.01 |
| Consumption ratio | 1.89 |

* This is the total water formed including that which is adsorbed.

It will be noted that by the addition of the water-adsorbent material the yield of hydrocarbons per mol of CO fed is improved by about 30%. The $CO_2$ production is reduced by a ratio of about 5.5 and the uncoverted hydrogen by a ratio of about 6.5. Results at a 95% CO conversion level show advantages of the same order. It should be noted that there is a yield advantage in going to higher CO conversion beyond that corresponding to the increase in conversion, i. e., for a given rate of water formation the ratio of the hydrocarbon yields in the cases of 99% and 95% CO conversion, respectively, is greater than 99:95 since there is a tendency toward higher consumption ratios as the conversion is increased. Thus, even with a CO conversion of 99% the presence of the water-adsorbent material causes a considerable improvement in yields, as shown above.

While the foregoing description and exemplary operations have served to illustrate specific applications and results of the invention, other modifications obvious to those skilled in the art are within the scope of the invention. Only such limitations should be imposed on the invention as are indicated in the appended claims.

What is claimed is:

1. An improved process for producing hydrocarbons having more than one carbon atom per molecule from CO and $H_2$ by a catalytic synthesis reaction, which comprises contacting a synthesis gas containing CO and $H_2$ in synthesis proportions at synthesis conditions in a synthesis stage with a synthesis catalyst mixed with about 10–50% by weight of a material having a strong adsorbing power for water vapor at the synthesis conditions and in proportions adequate to adsorb on said material a substantial proportion of the water vapor formed during said synthesis stage, recovering synthesis products formed during said synthesis stage and having a substantially reduced water content, removing water from said material in a non-oxidizing revivification stage to revivify said material and contacting said synthesis gas with said revivified material in a synthesis stage.

2. The process as claimed in claim 1 in which said synthesis gas contains about two volumes of $H_2$ per volume of CO.

3. The process as claimed in claim 1 in which said catalyst comprises iron and said synthesis conditions comprise temperatures of about 450°–700° F. and pressures of about 7–45 atm.

4. The process as claimed in claim 1 in which unreacted synthesis gas is recovered from said synthesis reaction, dried and recycled to said synthesis reaction.

5. The process as claimed in claim 1 in which said synthesis stage and said revivification stage are carried out in separate treating zones.

6. The process as claimed in claim 1 in which water is removed from said material by means of a relatively dry non-oxidizing gas at an elevated temperature.

7. The process as claimed in claim 1 in which water is removed from said material by means of relatively dry natural gas at an elevated temperature.

8. The process as claimed in claim 1 in which heat generated in said synthesis stage is used to supply heat required in said revivification stage.

9. A continuous process for producing hydrocarbons having more than one carbon atom per molecule from CO and $H_2$ by a catalytic synthesis reaction employing the fluid solids technique, which comprises contacting a synthesis gas containing CO and $H_2$ in synthesis proportions at synthesis conditions with a dense, turbulent, fluidized mixture of finely-divided synthesis catalyst and about 10–50% by weight of a solid water-adsorbent material in a reaction zone, in proportions adequate to adsorb a substantial portion of the water formed by the reaction, permitting said adsorbent to adsorb water formed by the reaction, removing synthesis products of a substantially reduced water content from said reaction zone, removing fluidized mixture of catalyst and adsorbent containing adsorbed water from said reaction zone, subjecting said withdrawn mixture in the form of a dense, turbulent, fluidized mass of solids to a drying treatment in a non-oxidizing revivification zone and returning the dried mixture to said reaction zone.

10. The process as claimed in claim 9 in which said mixture is treated in said revivification zone with a dry non-oxidizing gas.

11. The process as claimed in claim 9, in which heat generated in said reaction zone is supplied to said revivification zone.

12. The process as claimed in claim 9 in which CO and $H_2$ are contacted with said mixture in said revivification zone sufficient in amounts to produce just enough heat to maintain a temperature conducive to the revivification of said water absorbent material.

13. A continuous process for producing hydrocarbons having more than one carbon atom per molecule from CO and $H_2$ by a catalytic synthesis reaction employing the fluid solids technique, which comprises contacting a synthesis gas containing CO and $H_2$ in synthesis proportions at synthesis conditions of temperature and pressure with a dense, turbulent, fluidized mixture of finely divided synthesis catalyst and about 20–50% by weight of the catalyst of a solid water-adsorbent material in a reaction zone, in proportions adequate to adsorb a substantial portion of the water formed by the reaction permitting said adsorbent to adsorb water formed by the reaction, removing synthesis products of a substantially reduced water content from said reaction zone, removing fluidized water adsorbent containing adsorbed water from said reaction zone, supplying said removed water adsorbent substantially at said synthesis temperature to an elevated revivification zone maintained at a pressure lower than said synthesis pressure, subjecting said removed water adsorbent in the form of a dense, turbulent, fluidized mass of solids to a drying treatment in said revivification zone, and returning dried fluidized water adsorbent to said reaction zone under the pseudo-hydrostatic pressure of a vertical column of fluidized solids corresponding in height to the difference in elevation between said revivification and reaction zones.

14. The process of claim 13 in which heat of reaction of said reaction zone is indirectly transferred to a heat transfer medium and a substantial portion of said transferred heat is supplied to said revivification zone.

15. The process of claim 13 in which heat generated outside said reaction and revivification zones is supplied to said revivification zone.

16. An improved process for producing hydrocarbons having more than one carbon atom per molecule from CO and $H_2$ by a catalytic synthesis reaction, which comprises converting a mixture of gaseous hydrocarbons and steam produced as hereinafter described in a conversion stage into a synthesis gas containing carbon monoxide and hydrogen in synthesis proportions, contacting said synthesis gas at synthesis conditions with a synthesis catalyst in a synthesis stage in the presence of a material having a strong adsorbing power for water vapor at the synthesis conditions in proportions adequate to adsorb on said material a substantial proportion of the water vapor formed during said synthesis stage, recovering synthesis products formed during said synthesis stage, having a substantially reduced water content, contacting gaseous hydrocarbons with said material containing adsorbed water in a revivification stage at a revivification temperature to revivify said material and to produce said mixture of gaseous hydrocarbons and steam, supplying said last named mixture to said conversion stage, and contacting said synthesis gas with said revivified material in a synthesis stage.

17. The process of claim 13 in which said catalyst particles and said water adsorbent particles are present in said reaction zone in about equal proportions by weight.

HOMER Z. MARTIN.

REFERENCES CITED

The following references are of record in the file of this patent:

UNITED STATES PATENTS

| Number | Name | Date |
|---|---|---|
| 1,741,306 | Jaeger | Dec. 31, 1929 |
| 2,251,554 | Sabel | Aug. 5, 1941 |
| 2,270,903 | Rudbach | Jan. 27, 1942 |
| 2,347,682 | Gunness | May 2, 1944 |
| 2,360,787 | Murphree | Oct. 17, 1944 |
| 2,393,909 | Johnson | Jan. 29, 1946 |
| 2,406,864 | Thomas | Sept. 3, 1946 |

FOREIGN PATENTS

| Number | Country | Date |
|---|---|---|
| 278,353 | Great Britain | Sept. 25, 1929 |